US006773556B1

(12) United States Patent
Brockie et al.

(10) Patent No.: US 6,773,556 B1
(45) Date of Patent: Aug. 10, 2004

(54) METHOD FOR ENERGY BARRIER EQUALIZATION OF MAGNETIC RECORDING MEDIA AND MEDIA OBTAINED THEREBY

(75) Inventors: Richard Michael Brockie, Atherton, CA (US); Hans Jurgen Richter, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 29 days.

(21) Appl. No.: 10/131,139

(22) Filed: Apr. 25, 2002

Related U.S. Application Data
(60) Provisional application No. 60/343,783, filed on Oct. 18, 2001.

(51) Int. Cl.[7] .......................... C23C 14/34; C23C 16/00
(52) U.S. Cl. .................... 204/192.2; 427/523; 427/528; 427/531; 427/128; 427/130
(58) Field of Search .................. 204/192.2; 427/523, 427/524, 528, 531, 128, 130

(56) References Cited

U.S. PATENT DOCUMENTS

| | | | |
|---|---|---|---|
| 4,556,597 A | 12/1985 | Best et al. | 428/201 |
| 4,772,976 A * | 9/1988 | Otomo et al. | 360/125 |
| 5,051,288 A | 9/1991 | Ahlert et al. | 428/65.7 |
| 5,858,474 A | 1/1999 | Meyer et al. | 427/555 |
| 5,991,104 A | 11/1999 | Bonyhard | 360/15 |
| 5,998,048 A * | 12/1999 | Jin et al. | 429/994 T |
| 6,055,139 A | 4/2000 | Ohtsuka et al. | 360/131 |
| 6,086,961 A | 7/2000 | Bonyhard | 427/547 |
| 6,153,281 A | 11/2000 | Meyer et al. | 428/65.3 |
| 6,280,813 B1 | 8/2001 | Carey et al. | 428/65.3 |

FOREIGN PATENT DOCUMENTS

GB  1443248  9/1974

OTHER PUBLICATIONS

Suran et al. "Effect of Rare Gas Implantation on the Magnetic Properties of Amorphous CoTi Thin Films", IEEE Transactions On Magnetics, vol. MAG–23, No. 5, pp. 2740–2742, Sep. 1987.*

* cited by examiner

*Primary Examiner*—Rodney G. McDonald
(74) *Attorney, Agent, or Firm*—McDermott Will & Emery LLP

(57) ABSTRACT

A thin film magnetic recording medium, comprising:
  at least one ferromagnetic thin film recording layer comprising magnetic particles with substantially uniform barriers to magnetization reversal, formed by a process comprising steps of:
  (a) providing a precursor structure including at least one ferromagnetic thin film recording layer having a surface and a first, higher coercivity which may be greater than that which permits writing of the precursor structure, comprising magnetic particles having a distribution of energy barriers to magnetization reversal; and
  (b) uniformly bombarding the entire surface of the precursor structure with particles of sufficient dosage and energy to:
    (i) substantially equalize the energy barriers to magnetization reversal of the magnetic particles;
    (ii) lower the coercivity of the at least one ferromagnetic thin film recording layer from the first, higher coercivity to a second, lower coercivity within a range of coercivities permitting writing of the bombarded at least one recording layer;
    (iii) substantially retain the signal decay behavior of the precursor structure; and
    (iv) limit the reduction in signal-to-medium noise ratio (SMNR) of the precursor structure to a pre-selected small amount.

11 Claims, 3 Drawing Sheets

METHOD FOR ENERGY BARRIER EQUALIZATION OF MAGNETIC RECORDING MEDIA AND MEDIA OBTAINED THEREBY

CROSS-REFERENCE TO PROVISIONAL APPLICATION

This application claims priority from U.S. provisional patent application Serial No. 60/343,783 filed Oct. 18, 2001, the entire disclosure of which is incorporated herein by reference.

FIELD OF THE INVENTION

The present invention relates to a method for forming thin film magnetic recording media containing magnetic particles with uniform barriers to magnetic reversal without significant sacrifice in signal-to-medium noise ratio (SMNR), and to magnetic media obtained thereby. The present invention is of particular significance or utility in the manufacture of thermally stable, high SMNR and hence high areal recording density magnetic recording media, suitable for use in computer-related applications, e.g., hard disks.

BACKGROUND OF THE INVENTION

Magnetic recording media and devices incorporating same are widely employed in various applications, particularly in the computer industry for data/information storage and retrieval applications, typically in disk form. Conventional thin-film type magnetic media, wherein a fine-grained polycrystalline magnetic alloy layer serves as the active recording layer, are generally classified as "longitudinal" or "perpendicular", depending upon the orientation of the magnetic domains of the grains of magnetic material.

A portion of a conventional longitudinal recording, thin-film, hard disk-type magnetic recording medium 1 commonly employed in computer-related applications is schematically illustrated in FIG. 1 in simplified cross-sectional view, and comprises a substantially rigid, non-magnetic metal substrate 10, typically of aluminum (Al) or an aluminum-based alloy, such as an aluminum-magnesium (Al—Mg) alloy or a suitable glass, ceramic, glass-ceramic, or polymeric material, or a composite or laminate of these materials, having sequentially deposited or otherwise formed on a surface 10A thereof a plating layer 11, such as of amorphous nickel-phosphorus (Ni—P); a seed layer 12A of an amorphous or fine-grained material, e.g., a nickel-aluminum (Ni—Al) or chromium-titanium (Cr—Ti) alloy; a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 11–14 may be deposited by suitable physical vapor deposition ("PVD") techniques, such as sputtering, and layer 15 is typically deposited by dipping or spraying.

In operation of medium 1, the grains in the magnetic layer 13 are locally aligned by a write transducer, or write "head", to record and thereby store data/information therein. While moving over the surface of medium 1, the write transducer or head creates a highly concentrated magnetic field which alternates direction based on the bits of information to be stored. When the local magnetic field produced by the write transducer is greater than the coercivity of the material of the recording medium layer 13, the magnetization direction of the grains (i.e., single magnetic domain particles) of the polycrystalline material at that location is aligned in the direction of the applied magnetic field. The grains retain their alignment after the magnetic field applied thereto by the write transducer is removed. Thus the magnetization direction of the grains matches the direction of the magnetic field applied thereto. The magnetization pattern of the recording medium layer 13 can subsequently produce an electrical response in a read transducer, or read "head", allowing the stored information to be read.

In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

A typical perpendicular recording system 20 utilizing a vertically oriented magnetic medium 21 with a relatively thick soft magnetic underlayer, a relatively thin hard magnetic recording layer, and a single-pole head, is illustrated in FIG. 2, wherein reference numerals 22, 23, 24, and 25, respectively, indicate the substrate, soft magnetic underlayer, at least one non-magnetic interlayer, and vertically oriented, hard magnetic recording layer of perpendicular magnetic medium 21, and reference numerals 27 and 28, respectively, indicate the single and auxiliary poles of single-pole magnetic transducer head 26. Relatively thin interlayer 24 (also referred to as an "intermediate" layer), comprised of one or more layers of non-magnetic materials, serves to (1) prevent magnetic interaction between the soft underlayer 23 and the hard recording layer 25 and (2) promote desired microstructural and magnetic properties of the hard recording layer. As shown by the arrows in the figure indicating the path of the magnetic flux φ, flux φ is seen as emanating from single pole 27 of single-pole magnetic transducer head 26, entering and passing through vertically oriented, hard magnetic recording layer 25 in the region above single pole 27, entering and travelling along soft magnetic underlayer 23 for a distance, and then exiting therefrom and passing through vertically oriented, hard magnetic recording layer 25 in the region above auxiliary pole 28 of single-pole magnetic transducer head 26. The direction of movement of perpendicular magnetic medium 21 past transducer head 26 is indicated in the figure by the arrow above medium 21.

With continued reference to FIG. 2, vertical lines 29 indicate grain boundaries of each polycrystalline (i.e., granular) layer of the layer stack constituting medium 21. As apparent from the figure, the width of the grains (as measured in a horizontal direction) of each of the polycrystalline layers constituting the layer stack of the medium is substantially the same, i.e., each overlying layer replicates the grain width of the underlying layer. Not shown in the figure, for illustrative simplicity, are a protective overcoat layer, such as of a diamond-like carbon (DLC) formed over hard magnetic layer 25, and a lubricant topcoat layer, such as of a perfluoropolyethylene material, formed over the protective overcoat layer. Substrate 22 is typically disk-shaped and comprised of a non-magnetic metal or alloy, e.g., Al or an Al-based alloy, such as Al—Mg having an Ni—P plating layer on the deposition surface thereof, or substrate 22 is comprised of a suitable glass, ceramic, glass-ceramic, polymeric material, or a composite or laminate of these materials; underlayer 23 is typically comprised of an about 2,000 to about 4,000 Å thick layer of a soft magnetic material selected from the group consisting of Ni, NiFe (Permalloy), Co, CoZr, CoZrCr, CoZrNb, CoFe, Fe, FeN, FeSiAl, FeSiAlN, etc.; interlayer 24 typically comprises an up to about 100 Å thick layer of a non-magnetic material, such as TiCr; and hard magnetic layer 25 is typically comprised of an about 100 to about 250 Å thick layer of a Co-based alloy including one or more elements selected from the group consisting of Cr, Fe, Ta, Ni, Mo, Pt, V, Nb, Ge, and B, iron oxides, such as $Fe_3O_4$ and $\delta\text{-}Fe_2O_3$, or a $(CoX/Pd$ or $Pt)_n$ multilayer magnetic superlattice structure, where n is an integer from about 10 to about 25, each of the alternating, thin layers of Co-based magnetic alloy is from about 2 to about 3.5 Å thick, X is an element selected from the group consisting of Cr, Ta, B, Mo, and Pt, and each of the alternating thin, non-magnetic layers of Pd or Pt is about 1 Å thick. Each type of hard magnetic recording layer material has perpendicular anisotropy arising from magneto-crystalline anisotropy ($1^{st}$ type) and/or interfacial anisotropy ($2^{nd}$ type).

Efforts are continually being made with the aim of increasing the areal recording density, i.e., the bit density, or bits/unit area, by increasing the signal-to-medium noise ratio (hereinafter "SMNR") of the magnetic media. However, severe difficulties are encountered when the bit density of longitudinal media is increased above about 20–50 $Gb/in^2$ in order to form ultra-high recording density media, such as thermal instability, when the necessary reduction in grain size exceeds the superparamagnetic limit. Such thermal instability can, inter alia, cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, is by formation of a stacked layer structure wherein stabilization of a stacked pair of vertically separated ferromagnetic layers is provided via coupling of a ferromagnetic recording layer with another ferromagnetic layer or an anti-ferromagnetic layer, as has been recently proposed (see, e.g., E. N. Abarra et al., IEEE Conference on Magnetics, Toronto, April 2000 and U.S. Pat. No. 6,280,813 B1, the entire disclosure of which is incorporated herein by reference). According to this approach for providing stabilized magnetic recording media (hereinafter "AFC" media) comprised of at least a pair of the vertically spaced apart ferromagnetic layers are anti-ferromagnetically coupled together by means of an interposed thin, non-magnetic spacer layer. The coupling is presumed to increase the effective volume of each of the magnetic grains, thereby increasing their stability.

Still another proposed solution to the problem of thermal instability of very fine-grained magnetic recording media is to provide stabilization, hence increased SMNR, via formation of laminated media (hereinafter "LM" media), as for example, disclosed in U.S. Pat. No. 5,051,288, the entire disclosure of which is incorporated herein by reference. Such LM media comprise typically two or more stacked ferromagnetic layers separated by a non-magnetic spacer layer, where, in contrast to AFC media, the spacer layer generally is thicker and is provided for physically separating, rather than coupling, a pair of vertically stacked ferromagnetic layers; i.e., the strength of any magnetic coupling between the stacked ferromagnetic layers is smaller than the magnetic energies of the grains of each of the ferromagnetic layers.

Yet another approach for overcoming the problem of thermal instability of very fine-grained magnetic recording media is to form "hybrid" media, i.e., media comprised of a combination of two or more portions of different media types, e.g., longitudinal+perpendicular, AFC+laminated media, etc.

Regardless of the type of magnetic media, i.e., longitudinal, perpendicular, AFC, laminated, hybrid, etc., a major goal of magnetic thin film media design is formation of media wherein the magnetic particles (grains) thereof have uniform energy barriers to magnetization reversal. Design and fabrication of practical media with high or increased signal-to-media noise ratio (SMNR) must take into account three distinct distributions, i.e., the distribution of physical sizes of the individual magnetic grains, the switching field distribution, and the energy barrier distribution. The "switching field" is the strength of the magnetic field required to be supplied by the transducer head to the medium in order to reverse the magnetic alignment of a single grain, and the "energy barrier" is the resistance of the grain to thermally induced reversal of its magnetization direction. While the switching field and energy barrier are related to the size of the grain, they are not directly equivalent in practical media due to magnetic coupling ("exchange") effects which cause the magnetic grains to consist of one or more physical grains. Thus, the number of physical grains is greater than the number of magnetic grains, and the mean effective size of a magnetic grain is greater than the mean physical size of the grains.

The SMNR performance of magnetic recording media is determined by the mean of the switching field distribution. A medium is more difficult to write when there is a significant "tail" to the higher switching fields. As a consequence, it is desired to eliminate such difficult-to-write switching fields. Long term stability of the magnetic grain alignment of written media is related to the energy barrier distribution, and is poor when there is a large number of grains with low energy barriers. Thus, it is desired to eliminate the presence of such low energy barriers. In practical media, there is some correspondence between the large energy barriers/large switching fields and the low energy barriers/low switching fields. Therefore, development of a practical, cost-effective process by which the energy barriers of the media can be altered such that they become more uniform, i.e., have a narrower distribution, is considered desirable.

According to current practices for design of magnetic media, the above-mentioned mean value of the energy barrier distribution is kept quite high in order to ensure that only an insignificant number of grains have energy barriers which are low enough such that they are subject to loss of alignment. If the energy barrier distribution were made narrower, however, the mean of the energy barrier distribution could be safely shifted to a lower value without incurring a penalty of increased signal decay. A typical approach for achieving a lower mean energy barrier distribution is to reduce the thickness of the magnetic layer(s) of the media, whereby an improvement in SMNR is obtained via a reduction in the effective write transducer-to-medium separation. However, such approach is limited by the necessity for maintaining a minimum thickness of the magnetic layer(s).

One method of obtaining media with uniform grain size, hence uniform energy barriers to magnetization reversal, is to deposit the ferromagnetic thin film recording layer(s) with as uniform a magnetic particle or grain size as possible, and to ensure that the uniformly sized magnetic particles or grains do not magnetically interact with neighboring magnetic particles or grains, e.g., as by forming non-magnetic grain boundaries. However, a significant impediment to obtainment of the desired uniformly sized magnetic particles or grains of the ferromagnetic thin film recording layers of the above described types of thin film magnetic recording media arises from the widespread use of sputtering techniques for depositing the ferromagnetic thin film recording layers. Specifically, ferromagnetic thin film layers prepared according to conventional sputtering techniques typically contain a distribution of magnetic particle or grain sizes, hence a distribution of energy barriers to magnetization reversal, and as a consequence, the stated goal of obtaining uniform energy barriers to magnetization reversal cannot be obtained via conventional sputtering techniques and methodology.

In view of the foregoing, there exists a clear need for improved, high areal recording density, thin film magnetic recording media (regardless of type) having ferromagnetic thin film recording layers wherein the presence of difficult-to-write switching fields is substantially eliminated or at least minimized, and wherein the distribution of energy barriers to magnetization reversal is narrowed, and methodology therefor which can be readily practiced in cost-effective manner (by use of conventional deposition techniques such as sputtering) at product throughput rates consistent with the requirements of automated manufacture of magnetic recording media, e.g., hard disks.

The present invention, therefore, provides methodology by which thin film magnetic recording media of various types and designs can be rapidly and costa, effectively manufactured (by means of conventional deposition techniques such as sputtering) with ferromagnetic thin film recording layers having magnetic grains with more uniform energy barriers to magnetization reversal, i.e., narrow energy barrier distributions of lower mean energy, but without a large number of grains with energy barriers low enough as to result in magnetization reversal.

DISCLOSURE OF THE INVENTION

An advantage of the present invention is an improved method of manufacturing a thin film magnetic recording medium.

Another advantage of the present invention is an improved method of manufacturing a thin film magnetic recording medium comprising magnetic particles with substantially uniform barriers to magnetization reversal.

Still another advantage of the present invention is an improved thin film magnetic recording medium.

Yet another advantage of the present invention is an improved thin film magnetic recording medium comprising at least one ferromagnetic thin film recording layer comprising magnetic particles with substantially uniform barriers to magnetization reversal.

Additional advantages and other aspects of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by a method of manufacturing a thin film magnetic recording medium comprising at least one ferromagnetic thin film recording layer having magnetic particles with substantially uniform barriers to magnetization reversal, the method comprising steps of:

(a) providing a precursor structure for a thin film magnetic recording medium, the precursor structure including a surface and at least one ferromagnetic thin film recording layer having a first, higher coercivity, which first, higher coercivity may be greater than that which permits writing of the precursor structure, the at least one ferromagnetic thin film recording layer comprising magnetic particles having a distribution of energy barriers to magnetization reversal; and (b) uniformly bombarding the entire surface of the precursor structure with particles of sufficient dosage and energy to:
  (i) substantially equalize the energy barriers to magnetization reversal of the magnetic particles;
  (ii) lower the coercivity of the at least one ferromagnetic thin film recording layer from the first, higher coercivity to a second, lower coercivity within a range of coercivities permitting writing of the bombarded at least one ferromagnetic thin film recording layer;
  (iii) substantially retain the signal amplitude decay behavior of the precursor structure; and
  (iv) limit the reduction in signal-to-medium noise ratio (SMNR) of the precursor structure to a pre-selected small amount.

According to an embodiment of the present invention:

step (a) comprises providing a precursor structure for a thin film magnetic recording medium having a first, higher coercivity from about 4,000 to about 5,500 Oe; and step (b) comprises:
  (i) substantially equalizing the energy barriers to magnetization reversal of the magnetic particles to within a range from about 50 to about 80 kT, depending upon the media design;
  (ii) lowering the first, higher coercivity to a second, lower coercivity from about 2,500 to about 4,500 Oe;
  (iii) limiting the change in the signal amplitude decay behavior of the precursor structure to not more than about 1%/decade; and
  (iv) limiting the reduction in the SMNR of the precursor structure to not more than about 2 dB.

In accordance with various embodiments of the present invention:

step (a) comprises providing a precursor structure for a longitudinal, perpendicular, anti-ferromagnetically coupled (AFC), or hybrid thin film magnetic recording medium, wherein step (a) comprises providing the precursor structure by a process comprising forming the at least one ferromagnetic thin film recording layer having the first, higher coercivity by sputtering; step (b) comprises bombarding the surface of the precursor structure with neutral particles or ions, the neutral particles or ions having sufficient kinetic energy to dislodge atoms from the crystal lattice of the at least one ferromagnetic thin film recording layer and/or to result in implantation therein.

According to certain embodiments of the present invention, step (b) comprises bombarding the surface of the precursor structure with neutral particles or ions at a dosage sufficient to result in at least a pre-selected minimum reduction in coercivity; e.g., step (b) comprises bombarding the precursor structure with from about 10 to about 50 KeV ions selected from among helium, neon, argon, krypton, xenon, nitrogen, oxygen, and chromium ions.

In accordance with particular embodiments of the present invention, step (b) comprises bombarding the surface of the precursor structure provided in step (a) with 25 KeV Ar ions at a dosage, expressed as $(ions/cm^2)^{1/2}/10^7$, which is greater than about 2.5 to lower the first, higher coercivity of about 4,000–5,500 Oe to the second, lower coercivity of about 2,500–4,500 Oe.

According to still other embodiments of the present invention, step (b) comprises bombarding the surface of the precursor structure with neutral particles formed by electrically neutralizing ions prior to impact with the surface; e.g., step (b) comprises bombarding the precursor structure with neutral particles derived from ions selected from among helium, argon, neon, krypton, xenon, nitrogen, oxygen, and chromium ions.

Another aspect of the present invention is a thin film magnetic recording medium, comprising:

at least one ferromagnetic thin film recording layer comprising magnetic particles with substantially uniform barriers to magnetization reversal, the thin film magnetic recording medium made by a process comprising steps of:

(a) providing a precursor structure for a thin film magnetic recording medium, said precursor structure including a surface and at least one ferromagnetic thin film recording layer having a first, higher coercivity, the first, higher coercivity being greater than that which permits writing of the precursor structure, the at least one ferromagnetic thin film recording layer comprising magnetic particles having a distribution of energy barriers to magnetization reversal; and (b) uniformly bombarding the entire surface of the precursor structure with particles of sufficient dosage and energy to:

(i) substantially equalize the energy barriers to magnetization reversal of the magnetic particles;

(ii) lower the coercivity of the at least one ferromagnetic thin film recording layer from said first, higher coercivity to a second, lower coercivity within a range of coercivities permitting writing of the bombarded at least one ferromagnetic thin film recording layer;

(iii) substantially retain the signal amplitude decay behavior of the precursor structure; and (iv) limit the reduction in signal-to-medium noise ratio (SMNR) of the precursor structure to a pre-selected small amount.

According to embodiments of the present invention, the precursor structure for a thin film magnetic recording medium provided in step (a) has a first, higher coercivity from about 4,000 to about 5,500 Oe; and the particle bombardment of step (b) comprises:

(i) substantially equalizing the energy barriers to magnetization reversal of the magnetic particles to within a range from about 50 to about 80 kT;

(ii) lowering the first, higher coercivity to a second, lower coercivity from about 2,500 to about 4,500 Oe;

(iii) limiting the change in the signal amplitude decay behavior of the precursor structure to not more than about 1%/decade; and (iv) limiting the reduction in SMNR of the medium to not more than about 2 dB.

In accordance with various alternative embodiments of the present invention, the medium is a longitudinal medium, a perpendicular medium, an anti-ferromagnetically coupled (AFC) medium, or a hybrid medium; and in each instance the medium comprises a non-magnetic substrate with a thin film layer stack formed on at least one major surface of the substrate, the layer stack comprising the at least one bombarded ferromagnetic thin film recording layer.

Still another aspect of the present invention is a thin film magnetic recording medium, comprising:

(a) a non-magnetic substrate; and (b) means on the substrate for providing at least one ferromagnetic thin film recording layer with magnetic particles with substantially equalized energy barriers to magnetization reversal.

Additional advantages and aspects of the present invention will become apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features, wherein.

DESCRIPTION OF THE INVENTION

Figure 1:
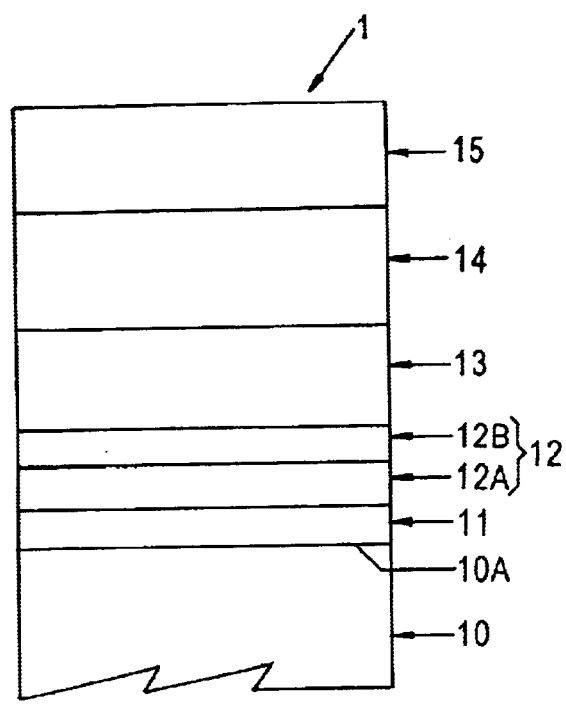
FIG. 1 schematically illustrates, in simplified cross-sectional view, a portion of a conventional thin film, longitudinal-type magnetic disk recording medium.
Figure 2:
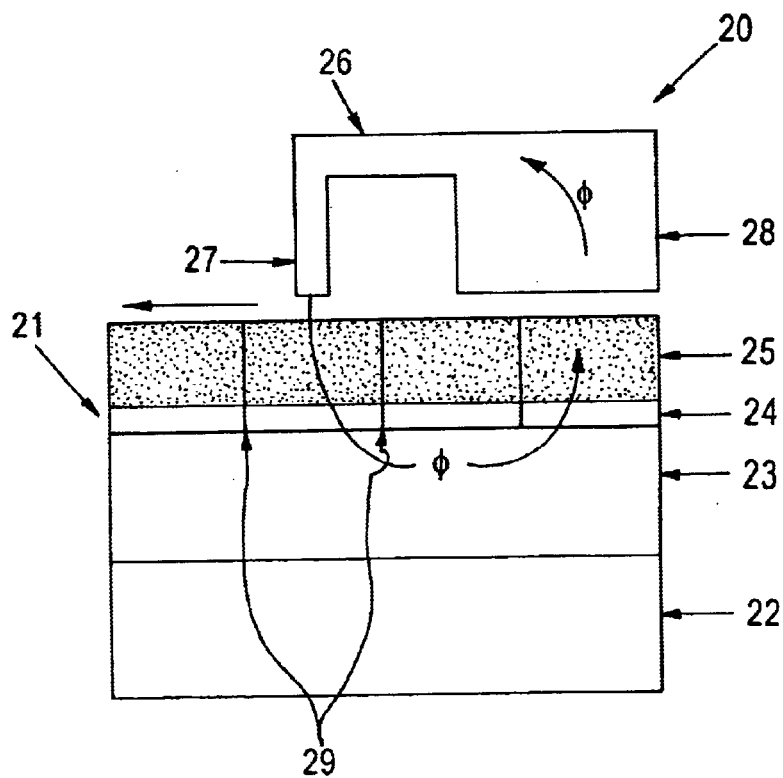
FIG. 2 schematically illustrates, in simplified cross-sectional view, a portion of a conventional thin film, perpendicular-type magnetic disk recording medium.

The present invention addresses and solves problems and difficulties associated with formation of thin film magnetic recording media with polycrystalline ferromagnetic recording layers having uniform particle or grain size, hence uniform energy barriers to magnetization reversal, as when the recording layers are formed by conventional thin film deposition techniques, e.g., sputtering, which conventional deposition methods typically result in a disadvantageous distribution of particle or grain size leading to a corresponding disadvantageous distribution of energy barriers to magnetization reversal. More specifically, the present invention is based upon recognition that particle bombardment/implantation of the entire surface of a precursor structure for the thin film magnetic recording medium, rather than selective bombardment of portions of the medium surface for patterning purposes, can be advantageously utilized in a rapid and cost effective manner for formation of thin film magnetic recording media wherein the ferromagnetic thin film recording layer(s) is (are) comprised of uniformly sized magnetic particles or grains with correspondingly uniform energy barriers to magnetization reversal. Moreover, the inventive methodology can be practiced with a variety of types of thin film magnetic recording media, including inter alia, longitudinal, perpendicular, anti-ferromagnetically coupled (AFC), laminated (LM), and combinations thereof, i.e., hybrid media, and with a variety of bombarding particles, including ions and neutral atoms of helium, neon, argon, krypton, xenon, nitrogen, oxygen, and chromium.

According to a first step of the invention, a "precursor structure" for a thin film magnetic recording medium is provided, the precursor structure comprising a stack of thin film layers on a surface of a non-magnetic substrate, the layer stack being configured in conventional fashion according to the design criteria for one of the above-mentioned types of thin film magnetic recording media, but without a lubricant topcoat and, if desired, without a protective overcoat at the upper surface thereof. Significantly, the one or more ferromagnetic thin film recording layers of the layer stack is (are) formed with a very high coercivity, i.e., from about 4,000 to about 5,500 Oe, which coercivity may be higher than that which permits writing of the precursor structure, as by conventional sputtering techniques, typically magnetron sputtering.

According to the next step of the present invention, the entire surface of the precursor structure is uniformly bombarded with ions or neutral particles of dosage and energy sufficient to simultaneously:

1. substantially equalize the energy barriers to magnetization reversal of the magnetic particles or grains;
2. lower the coercivity of the one or more ferromagnetic thin film recording layer from the first, very high coercivity to a second, lower coercivity within a range of coercivities permitting writing of the one or more bombarded ferromagnetic thin film recording layers;
3. substantially retain the signal decay behavior of the precursor structure prior to bombardment; and
4. limit the reduction in signal-to-medium noise ratio (SMNR) of the precursor structure due to ion bombardment to a pre-selected small amount.

The inventive methodology comprising uniform bombardment of the entire surface of the precursor structure for a thin film magnetic recording medium thus advantageously results in the coercivity of the entire resulting medium being brought into a writable range, while at the same time equalizing the energy barriers to magnetization reversal of the magnetic particles or grains. Further, the bombardment process is advantageously applicable to virtually all known types of thin film magnetic recording media and substantially retains the signal decay behavior exhibited by the precursor structure prior to particle bombardment and the signal-to-media noise (SMNR) performance of the resulting medium is reduced only slightly from that of the precursor structure prior to particle bombardment.

The bombardment step according to the invention may be practiced with neutral particles or ions having sufficient energy to dislodge atoms from the crystal lattice(s) of the one or more ferromagnetic thin film recording layer(s) and/or to result in implantation therein, the dosage of bombarding particles being sufficient to result in at least a pre-selected minimum reduction in coercivity of the precursor she. Obtainment of the desired reduction in coercivity, etc. according to the invention is generally insensitive to the nature of the bombarding species; consequently the invention may be practiced with a wide variety of ionic and neutral particles, including ions of from about 10 to about 50 KeV selected from among helium, neon, argon, krypton, xenon, nitrogen, oxygen, and chromium ions or neutral particles derived from the recited ions by neutralization prior to impact with the surface of the precursor structure, e.g., by electron irradiation.

Typically, the first step according to the invention comprises providing a precursor structure for a thin film magnetic recording medium having a first, higher coercivity from about 4,000 to about 5,500 Oe; and the second, bombardment step comprises:

1. substantially equalizing the energy barriers to magnetization reversal of the magnetic particles to within a range from about 50 to about 80 kT;
2. lowering the first, higher coercivity to a second, lower coercivity from about 2,500 to about 4,500 Oe;
3. limiting the change in signal amplitude decay behavior of the bombarded/implanted precursor structure to not more than about 1%/decade; and
4. limiting the reduction in the SMNR of the bombarded/implanted precursor structure to not more than about 2 dB.

The inventive methodology comprising uniform bombardment of the entire surface of the precursor structure for a thin film magnetic recording medium differs in essential respect from prior techniques comprising selective bombardment and/or implantation of portions of thin film magnetic recording media for the purpose of forming servo patterns therein comprised of ion bombarded and/or implanted non-magnetic regions or regions with lower coercivity than that of the regions of the media surface which are not bombarded/implanted, as for example, disclosed in U.S. Pat. Nos. 6,153,281 and 5,858,474 to Meyer et al.; U.S. Pat. Nos. 6,086,961 and 5,991,104 to Bonyhard; U.S. Pat. No. 6,055,139 to Ohtsuka et al.; U.S. Pat. No. 4,556,597 to Best et al; U.K. Pat. 1,443,248 to Sargunar; and commonly assigned, co-pending U.S. patent application Ser. No. 09/912,065 filed Jul. 25, 2001, the entire disclosures of which are incorporated herein by reference.

EXAMPLE

Figure 3:
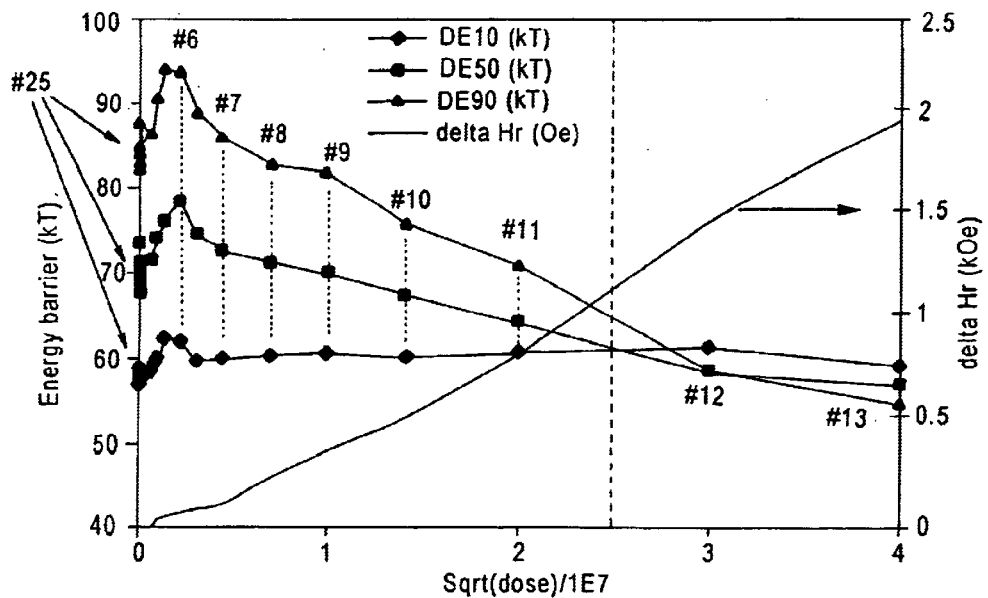
FIG. 3 is a graph showing the change in energy barrier to magnetization reversal and reduction in coercivity of conventional longitudinal-type, disk-shaped precursor structures for thin film media as a function of bombardment/implantation dosage of 25 KeV Ar ions, according to an illustrative embodiment of the invention.

A series of longitudinal thin film media precursor structures fabricated on both sides of 95 mm diameter disk-shaped substrates and comprising a sputtered recording layer of a Co-based alloy were subjected to bombardment/implantation with various doses of 25 KeV Ar ions. Referring to FIG. 3, shown therein is a graph illustrating the change in energy barrier to magnetization reversal (left side ordinate, measured by means of a technique similar to that disclosed in *IEEE Trans. Magnetics*, 37, 1528 (2001)) and reduction in coercivity (right side ordinate) of the precursor structures as a function of bombardment/implantation dosage of 25 KeV Ar ions, wherein the notations "DE 10", "DE 50", and "DE 90" respectively refer to the amount of magnetization which was switched in the reversal experiment and the numbers appearing above the plot for DE 90 indicate sample number. Bombardment/implantation dosages are indicated along the abscissa in terms of (ions/cm$^2$) $^{1/2}$/10$^7$. According to the magnetization reversal process, the samples are initially fully saturated prior to applying an increasing magnetization reversal field. By definition, when there is no magnetic field emanating from the sample, exactly 50% of the magnetic signal has been reversed to cancel out the other 50% which has not been reversed. This 50% point is defined as the coercivity of the medium. Points before and after the 50% point (i.e., the coercive point) are defined by the % magnetization reversal, e.g., DE 10 and DE 90. The magnetic layers of the samples comprise a distribution of grain sizes, wherein magnetization reversal is more easily obtained with the smaller grains than with the larger grains. The range of values spanned by DE 10, DE 50, and DE 90 indicate the energy barrier distribution, and the values indicated in FIG. 3 for reference sample 25 indicate the typical energy barrier distribution for a typical sputter-deposited magnetic medium.

The flat behavior of the DE 10 plot is significant and indicates that the decay behavior of the precursor structures for DE 10 media should not be significantly changed upon $Ar^+$ bombardment/implantation; and the convergence of the values of the energy barrier to magnetization reversal (refer to the left side ordinate) of the DE 10, DE 50, and DE 90 samples at $Ar^+$ doses (expressed as $(ions/cm^2)^{1/2}/10^7$) greater than about 2.5 (indicated by the vertical dashed line in the figure) implies that the distribution of energy barriers to magnetization reversal has been significantly narrowed as a result of $Ar^+$ bombardment/implantation at sufficiently high dosages. The vertical dashed line simultaneously delineates the minimum required coercivity decrease (refer to the right side ordinate) associated with the convergence of energy barriers to magnetization reversal, i.e., about 1 KOe, with a maximum coercivity decrease of about 2 kOe at an $Ar^+$ dose of about 4 (expressed as $(ions/cm^2)^{1/2}/10^7$).

Figure 4:
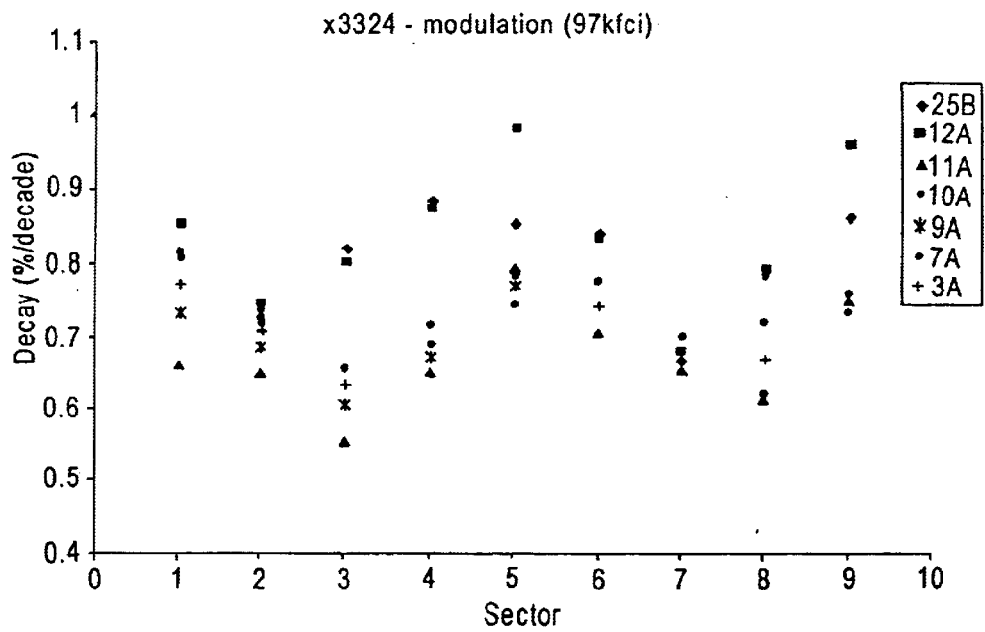
FIG. 4 is a graph showing the change in signal amplitude modulation decay at 97 kfci for 9 angular positions along the surface of the ion-bombarded/implanted, disk-shaped precursor structures of FIG. 3, for various ion bombardment dosages (wherein increasing number in the legend indicates increasing dose, except for sample 25 which was not subjected to the bombardment/implantation process)

As indicated above, the flat behavior of the DE 10 plot in FIG. 1 indicates that the decay behavior of the precursor structures for DE 10 media should not be significantly changed upon $Ar^+$ bombardment/implantation Adverting to FIG. 4, illustrated therein is a graph showing the change in signal amplitude decay modulation of a 97 kfci signal at a substrate temperature of 75° C., as measured at 9 angular locations over the surfaces of the ion-bombarded/implanted precursor structures of FIG. 3 (indicated by the disk sector number), for various ion bombardment dosage; wherein the sample identified as "25B" in the legend was not subjected to bombardment/implantation and the bombarded/implanted samples are identified in the legend by sample number and disk side, i.e., A or B. As is evident from the figure, signal modulation decay measurements performed at 97 kfci (a typical servo frequency) at 9 locations (sectors) around the disks indicated no significant change in the signal decay behavior.

Figure 5:
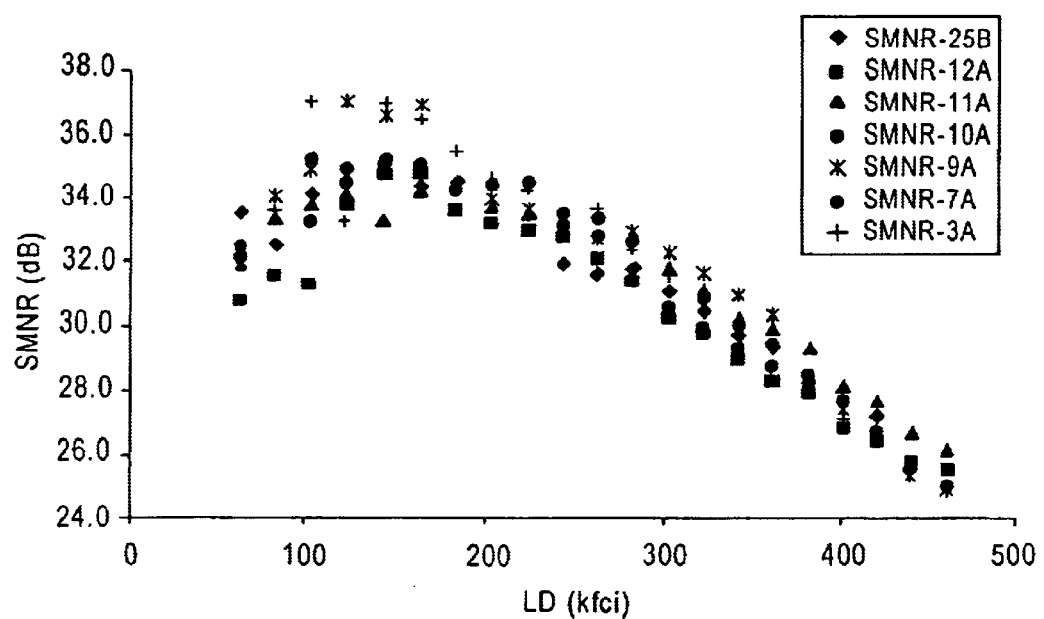
FIG. 5 is a graph showing the SMNR performance of the ion-bombarded disk-shaped media of FIG. 3, for various ion bombardment dosages.

The change, i.e., narrowing, in the energy barriers to magnetization reversal of the bombarded/implanted precursor structures shown in FIG. 3 implies occurrence of at least some exchange between the magnetic particles or grains which increases the volume thereof in compensation for the decrease in coercivity $H_r$ but with substantially similar signal decay behavior (FIG. 4). The result is expected to be a small penalty, i.e., a small decrease in SMNR performance, which expectation is confirmed by the SMNR data graphically illustrated in FIG. 5, measured at a substrate temperature of 75° C. (wherein the legend identifying the various samples is the same as that of FIG. 4).

Thus, the inventive methodology provides a method for rapid, cost-effective formation of all types of thin film magnetic recording media wherein the magnetic particles or grains advantageously have equalized energy barriers to magnetization reversal, and improved thin film magnetic recording media obtained thereby. Moreover, the inventive methodology is not limited to use with the illustrated disk-shaped media, but rather can be practiced with a variety of different magnetic data/information storage and retrieval media.

In the previous description, numerous specific details are set forth, such as specific materials, structures, reactants, processes, etc., in order to provide a better understanding of the present invention. However, the present invention can be practiced without resorting to the details specifically set forth. In other instances, well-known processing materials, species, and techniques have not been described in detail in order not to unnecessarily obscure the present invention.

Only the preferred embodiments of the present invention and but a few examples of its versatility are shown and described in the present disclosure. It is to be understood that the present invention is capable of use in other combinations and environments and is susceptible of changes and/or modifications within the scope of the inventive concept as expressed herein.

What is claimed is:

1. A method of manufacturing a thin film magnetic recording medium comprising at least one ferromagnetic thin film recording layer having magnetic particles with substantially uniform barriers to magnetization reversal, the method comprising steps of:

(a) providing a precursor structure for a thin film magnetic recording medium, said precursor structure including a surface and at least one ferromagnetic thin film recording layer having a first, higher coercivity, which first, higher coercivity may be greater than that which permits writing of said precursor structure, said at least one ferromagnetic thin film recording layer comprising magnetic particles having a distribution of energy barriers to magnetization reversal; and (b) uniformly bombarding the entire surface of said precursor structure with particles of sufficient dosage and energy to:

(i) substantially equalize the energy barriers to magnetization reversal of said magnetic particles;

(ii) lower the coercivity of said at least one ferromagnetic thin film recording layer from said first, higher coercivity to a second, lower coercivity within a range of coercivities permitting writing of the bombarded said at least one ferromagnetic thin film recording layer;

(iii) substantially retain the signal amplitude decay behavior of said precursor structure; and (iv) limit the reduction in signal-to-medium noise ratio (SMNR) of said precursor structure to a pre-selected amount.

2. The method according to claim 1, wherein:

step (a) comprises providing a precursor structure for a thin film magnetic recording medium having a first, higher coercivity from about 4,000 to about 5,500 Oe; and step (b) comprises:

(i) substantially equalizing said energy barriers to magnetization reversal of said magnetic particles to within a range from about 50 to about 80 kT;

(ii) lowering said first, higher coercivity to a said second, lower coercivity from about 2,500 to about 4,500 Oe;

(iii) limiting the change in said signal amplitude decay behavior of said precursor structure to not more than about 1%/decade; and (iv) limiting the reduction in said SMNR of said precursor structure to not more than about 2 dB.

3. The method according to claim 2, wherein:

step (a) comprises providing a precursor structure for a longitudinal, perpendicular, anti-ferromagnetically coupled (AFC), or hybrid thin film magnetic recording medium.

4. The method according to claim 3, wherein:

step (a) comprises providing said precursor structure by a process comprising forming said at least one ferromagnetic thin film recording layer having said first, higher coercivity by sputtering.

5. The method according to claim 1, wherein:

step (b) comprises bombarding the entire surface of said precursor structure with neutral particles or ions.

6. The method according to claim 5, wherein:

step (b) comprises bombarding said precursor structure with neutral particles or ions having sufficient kinetic energy to dislodge atoms from the crystal lattice of said at least one ferromagnetic thin film recording layer and/or to result in implantation therein.

7. The method according to claim 6, wherein:

step (b) comprises bombarding said precursor structure with neutral particles or ions at a dosage sufficient to result in at least a pre-selected minimum reduction in the coercivity thereof.

8. The method according to claim 7, wherein:

step (b) comprises bombarding said precursor structure with from about 10 to about 50 KeV ions selected from among helium, neon, argon, krypton, xenon, nitrogen, oxygen, and chromium ions.

9. The method according to claim 8, wherein:

step (b) comprises bombarding the surface of said precursor structure provided in step (a) with 25 KeV Ar ions at a dosage expressed as $(ions/cm^2)^{1/2}/10^7$ which is greater than about 2.5 to lower said first, higher coercivity of about 4,000–5,500 Oe to said second, lower coercivity of about 2,500–4,000 Oe.

10. The method according to claim 7, wherein:

step (b) comprises bombarding the surface of said precursor structure with neutral particles formed by electrically neutralizing ions prior to impact with said surface.

11. The method according to claim 10, wherein:

step (b) comprises bombarding said precursor structure with neutral particles derived from ions selected from among helium, neon, argon, krypton, xenon, nitrogen, oxygen, and chromium ions.

* * * * *